(12) United States Patent
Yeo et al.

(10) Patent No.: US 6,597,648 B1
(45) Date of Patent: Jul. 22, 2003

(54) OPTICAL DISK HAVING ANTI-PIRACY FUNCTION AND METHOD OF FABRICATING AND AUTHENTICATING THE OPTICAL DISK

(75) Inventors: Woon-Sung Yeo, Chungcheongbukdo (KR); Jae-Sun Lee, Kyunggido (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/364,071

(22) Filed: Jul. 30, 1999

(30) Foreign Application Priority Data

Jul. 30, 1998 (KR) ............................... 98-30966
Nov. 6, 1998 (KR) ............................. 98-47899

(51) Int. Cl.$^7$ ................................. G11B 5/09
(52) U.S. Cl. ................. 369/53.2; 369/53.21; 369/30.09
(58) Field of Search ................ 369/30.04, 30.05, 369/30.07, 30.08, 30.09, 30.19, 275.3, 53.2, 53.21

(56) References Cited

U.S. PATENT DOCUMENTS

| | | | |
|---|---|---|---|
| 5,177,720 A | * | 1/1993 | Kondo ................. 369/30.04 |
| 5,313,443 A | * | 5/1994 | Iitsuka ................. 369/47.24 |
| 5,530,686 A | * | 6/1996 | Schylander et al. ..... 369/30.04 |
| 6,424,615 B1 | * | 7/2002 | Ishimura et al. ........ 369/275.3 |

* cited by examiner

Primary Examiner—Thang V. Tran
(74) Attorney, Agent, or Firm—Birch, Stewart, Kolasch & Birch, LLP

(57) ABSTRACT

The present invention relates to an optical disk having data duplication prevention function, a method of authenticating such optical disk, and a method of fabricating such optical disk discriminated from a duplicated disk. For the optical disk, a prescribed field of subcode data, which is obtained from data recorded in a program area, is set to a value in such a manner that the value is different from that in the corresponding field of table-of-content data which is recorded in a lead-in area. Or reproduction control information associated with data recorded in a prescribed region in the program area is recorded in the reverse order. Depending on the existence of these unusual data patterns, the optical disk is judged as a legitimate production or an illegal production.

6 Claims, 10 Drawing Sheets

US 6,597,648 B1

OPTICAL DISK HAVING ANTI-PIRACY FUNCTION AND METHOD OF FABRICATING AND AUTHENTICATING THE OPTICAL DISK

BACKGROUND OF THE INVENTION

1. Field of the Invention

The present invention relates generally to anti-piracy of data on optical disks, more specifically, to optical disk having prevention function to protect data on an original optical disk, a method of authenticating such optical disk, and a method of fabricating such optical disk discriminated from a duplicated disk.

2. Description of the Related Art

As information storage medium in the multimedia environment, optical disks have been widely used for storage of music, movies, and software due to their high storage capacity. The optical disks have several advantages over other storage media in that mass-production is possible at a low price and that the quality of information thereon is not degraded even though reproduction or duplication thereof is made repeatedly.

The price of optical disks that are writable once and reproducible in ordinary optical disk players is lowering. Low-priced optical disk fabricating apparatuses have been, moreover, released into the market. Hence, optical disks containing commercial high-priced software tend to be duplicated illegally and spread as pirate disks, resulting in enormous economic loss in the software industry.

Strong policies have been made to inhibit or limit the illegal duplication of optical disks, but perfect prevention of the illegal duplication is impossible because the illegally copied disks can be fabricated readily and distributed privately. Accordingly, technologies are strongly demanded to inhibit illegal duplication of optical disks.

Many methods have been proposed to accomplish the duplication prevention. As one of them, Korean Patent Application S/N. 97-32576, proposed by these inventors, discloses a signal recording method for an optical disk with a copy-protection function and a method of preventing illegal duplication of the optical disk using the recording method.

In the method, a non-standard symbol or an unusual pit pattern is recorded on a prescribed area of an optical disk. The non-standard symbol is formed by shifting or delaying some part of a chosen standard symbol or codeword by a predetermined length, so that it can be equally reproduced as either of two distinct standard symbols. Therefore, an optical disk with one or more non-standard symbols is determined to be a legitimate production if they are reproduced into distinct symbols.

However, in order to form the unusual pit pattern in some areas of an optical disk, the delayed pit pattern must be written precisely into an undefined region, that is, a region located between consecutive pits outside of an allowed limit for normal pits. Accordingly, an optical disk production apparatus with a high precision is required to control the delay of a pit which is chosen to make the unusual pit pattern. However, the high-precise production apparatus costs high, resulting in the increase of the production cost.

The undefined region depends on manufacturers of optical disk drivers. Hence, the unusual pit pattern with the delayed pit is regarded as a non-standard symbol in some optical disk drivers, it is always reproduced as a standard symbol in the others. In the latter case, the desired authentication function does not work even though the optical disk is legitimate one.

SUMMARY OF THE INVENTION

It is an object of this invention to provide an optical disk with a duplication prevention function in which a value recorded in a prescribed field of reproduction control data is not coincident with that of the corresponding field of table-of-content (TOC) data, an authenticating method of such optical disk, and a fabrication method of such optical disk.

It is another object of this invention to provide an optical disk with a duplication prevention function in which some of reproduction control data are recorded in the reverse order, an authenticating method of such optical disk, and a fabrication method of such optical disk.

The optical disk with duplication prevention function according to the present invention is characterized in that a value in a prescribed field in a control data needed for reproduction and search is not coincident with that of the corresponding field in a TOC data.

The optical disk with duplication prevention function according to the present invention is further characterized in that some of reproduction control data are recorded thereon in the reverse order.

A method of authenticating the above-mentioned optical disk according to the present invention comprises the steps of reading out a table-of-content data from an lead-in area of the optical disk; extracting subcode data from data recorded in a program area of the optical storage medium; checking whether or not data in a prescribed field of the subcode data is coincident with that in the corresponding field of the table-of-content data; and determining whether the optical disk is a legitimate production or illegally-duplicated production on the basis of the checking result.

Another method of authenticating the above-mentioned optical disk according to the present invention comprises the steps of reading out data of a predetermined size from a prescribed area in the optical disk; checking whether or not some of reproduction control data within the read-out data exist in the reversed order; and determining whether the optical disk is a legitimate production or illegally-duplicated production on the basis of the checking result.

An optical disk according to the present invention is fabricated in such a manner that a prescribed field of a Q-channel data which is collected from header information of a predetermined number of frames has a value different from that in the corresponding field of a TOC data. When the optical disk is loaded in an optical disk driver, a TOC data is first read out from a lead-in area of the optical disk. Then, a Q channel data is obtained from data recorded in a program area of the disk. A comparison is made as to whether or not a value in the prescribed field of the Q-channel data is coincident with that in the corresponding field of the TOC data. The optical disk is judged as a legitimate disk if they are not equal to each other.

An optical disk according to of the present invention is fabricated in such a manner that data to be recorded are written to the optical disk in units of a predetermined size of data, and that reproduction control data corresponding to some of data in the units are written in the reverse order. When reproduction of the optical disk is requested, a predetermined amount of data are read out from a prescribed area of the optical disk and is then divided into several groups of a predetermined size of data. Then, it is checked whether some reversed reproduction control data exist in the data groups. If they are detected, the optical disk is judged as a legitimate production.

The present invention makes it possible to inhibit optical disks which are duplicated illegally from an optical disk of original record from being reproduced, thereby contributing the prevention of illegal duplication.

BRIEF DESCRIPTION OF THE DRAWINGS

The accompanying drawings, which are included to provide a further understanding of the invention, illustrate preferred embodiments of this invention, and together with the description, serve to explain the principles of the present invention.

In the drawings.

DESCRIPTION OF THE PREFERRED EMBODIMENTS

The preferred embodiments of the present invention will be described in detail referring to the accompanying drawings.

Figure 1:
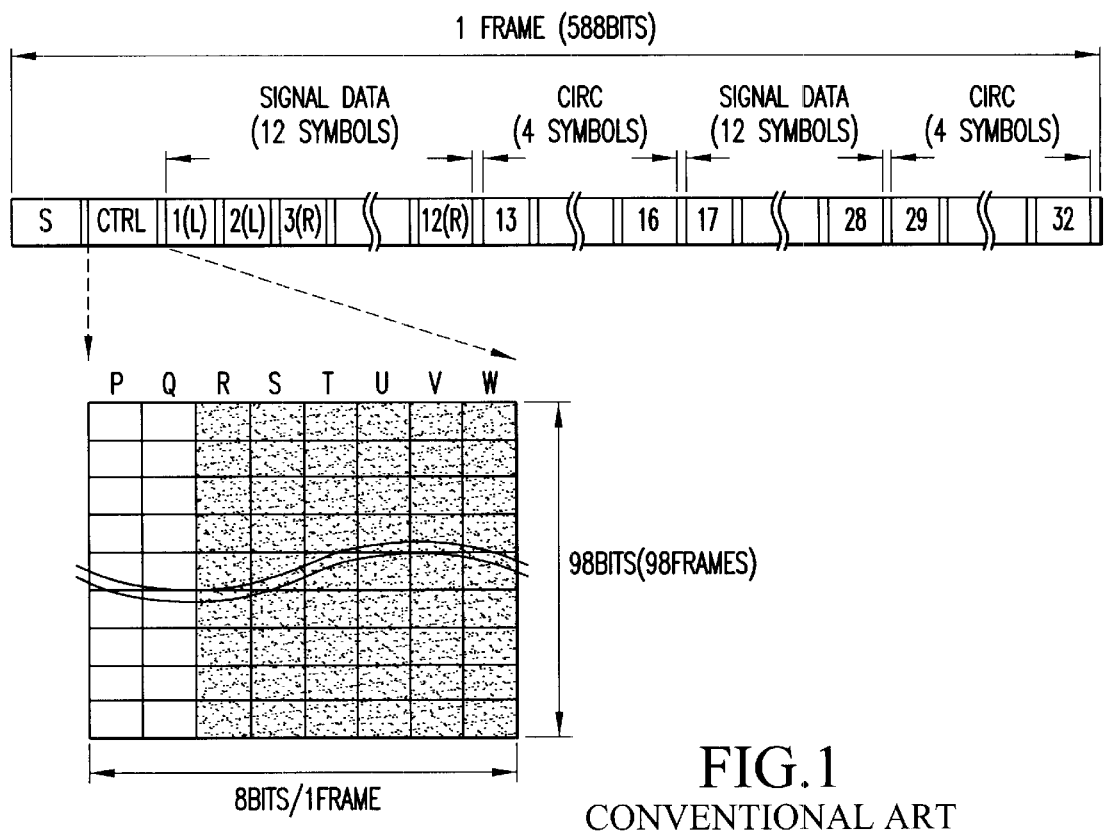
FIG. 1 is a schematic representation showing the structure of a frame on an optical disk and a subcode data.

The structure of a frame, a smallest unit of recording in optical disk systems, is shown in FIG. 1. The first 24 bits are used for synchronization data and the subsequent 14 bits are used for subcode data area. Pieces of subcode data are fetched from 95 frames, or a block and gathered to form a subcode data (98×8 bit) constituting data of P-, Q-, R-, S-, T-, U-, V-, W-channels. Of those channels, Q-channel data are used for management for accessing. Sub-Q channel data (denoted by "data" in FIGS. 2A and 2B) in the Q-channel data are generally used for fine access control. On the other hand, the sub-Q data stored in a lead-in area (track # 0 to #1) represents a table-of-content (TOC) information. Hereinafter, the Q-channel data in the lead-in area is referred to as TOC data.

Meanwhile, it should be noted that the TOC data and the Q-channel data in an optical disk are not copied to another optical disk when an optical disk is duplicated. This is because they are generated internally in an optical disk writer at the recording operation.

Figure 2A:
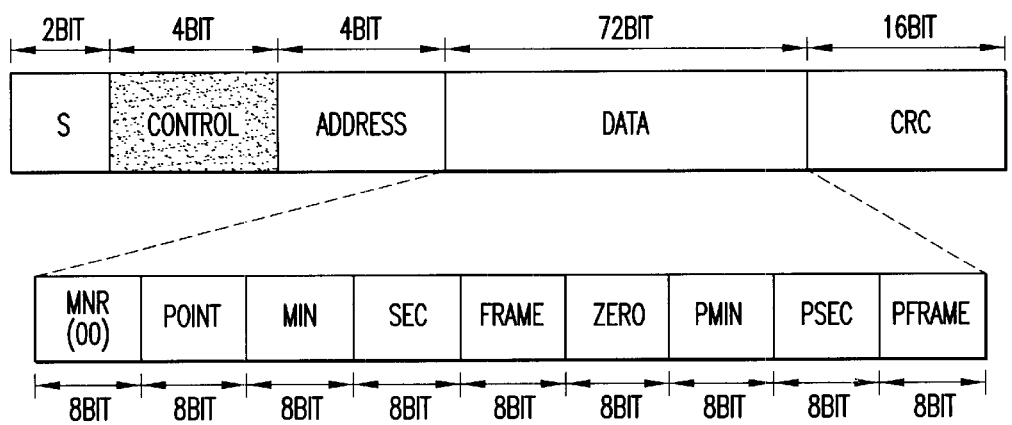
FIGS. 2A and 2B are schematic representations respectively showing a TOC data in a lead-in area and Q-channel data in a program area.
Figure 2B:
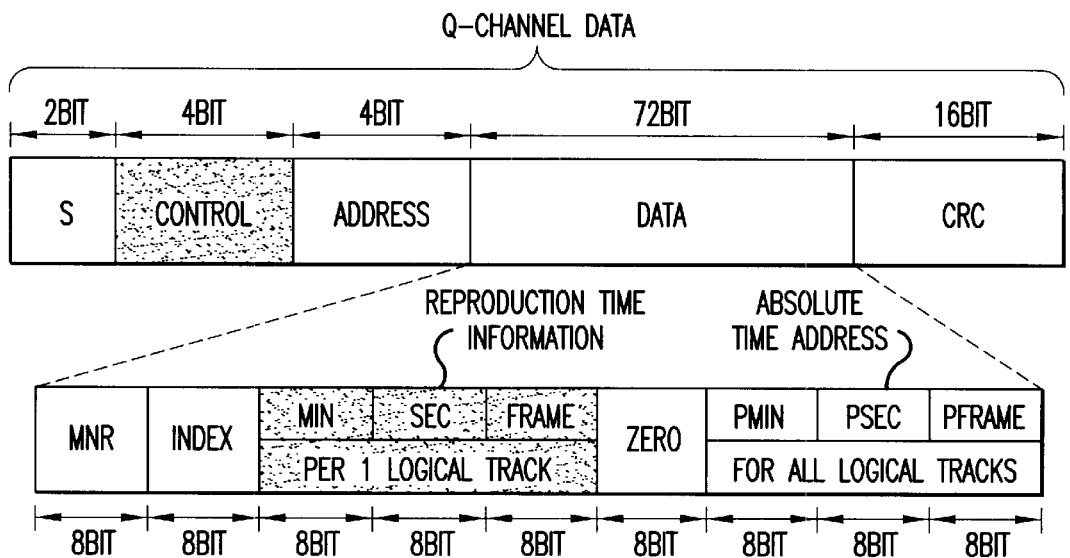

As shown in FIGS. 2A and 2B, both TOC data and Q-channel data have a 4-bit "control" field specifying the attributes of the recorded data on the optical disk, and their the 4-bit control fields have the same value. For example, in case of CD-DA, an "audio mode indicator code" is recorded in the "control" fields of both TOC data and Q-channel data.

In a method for fabricating optical disks according to the present invention, a value is written to the "control" field of a Q-channel data in such a manner that the value is not coincident with that of the "control" field in the TOC data.

Specifically, in case where an optical disk is CD-DA, "audio mode indicator code" is written to the "control" field of the TOC data, but "data mode indicator code" is recorded in the "control" field of all or part of the Q-channel data in a program area of the optical disk.

In case of CD-ROM, in addition to the operation of writing the "control" data as mentioned above, a program is written to a predetermined area to perform authentication of the CD-ROM by checking whether the "control" fields of the TOC data and the Q-channel data have different values from each other.

Generally, fabrication of optical disks requires several processes like manufacturing of the original record, master, and stamper. Optical disks are duplicated and mass-produced from the stamper in accordance with the injection molding technique. Resin which is to be hardened by ultraviolet is, first, filled between a glass-made surface-ground substrate and a stamper, and a pressure is then applied to the substrate ((a) of FIG. 9). Ultraviolet is irradiated toward the substrate and the resin being ((b) of FIG. 9). Then, an optical disk is developed where the data to be recorded and their associated subcodes are formed ((c) of FIG. 9).

An optical disk fabricated as above is not prevented from being reproduced in general optical disk drivers. This is because general optical disk drivers do not care whether or not the two "control" fields have identical values during read-out and reproduction operation.

Figure 4:
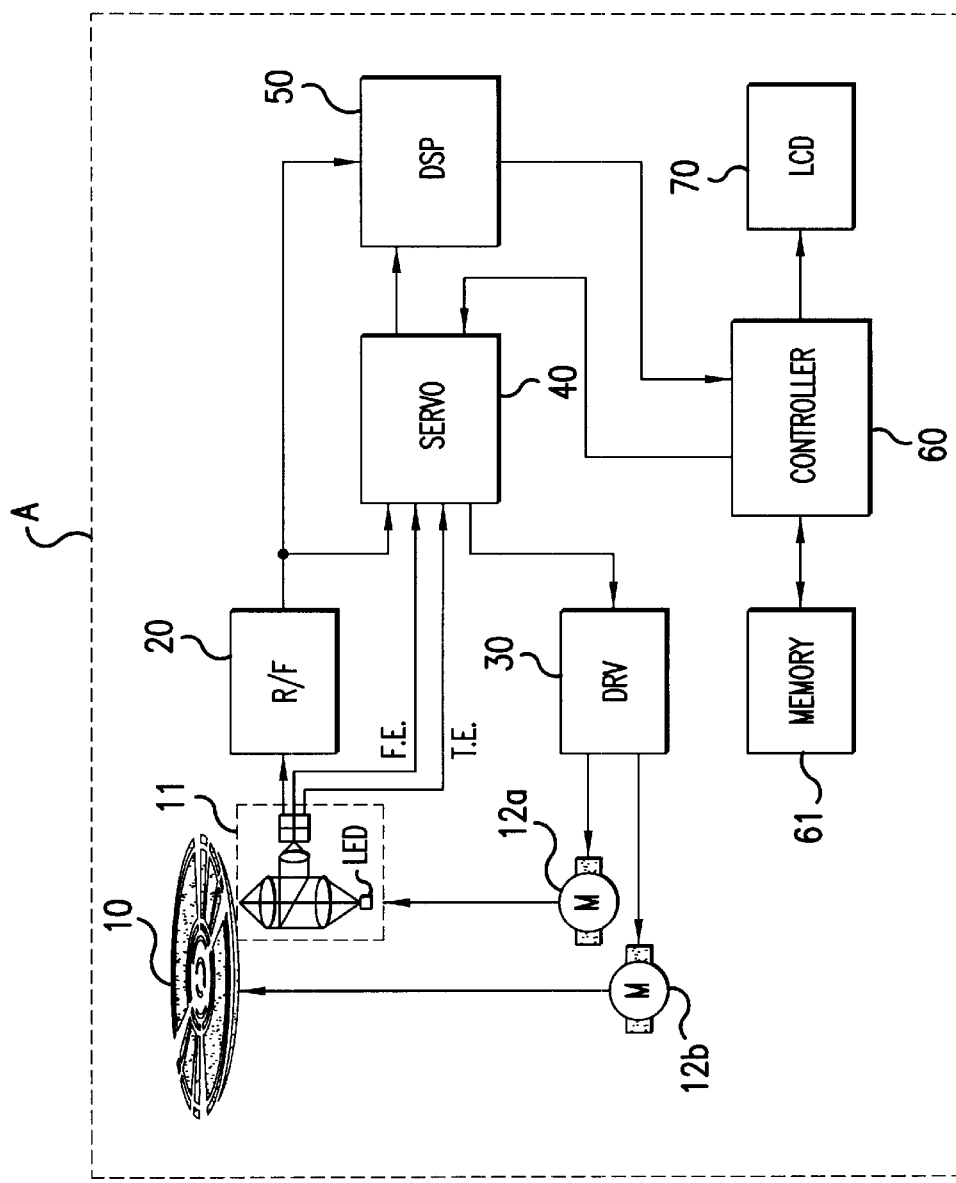
FIG. 4 is a schematic diagram showing an optical disk reproduction apparatus according to an embodiment of the present invention.

FIG. 4 depicts a functional block diagram of an optical disk reproduction apparatus to which a preferred embodiment of the present invention is applied, comprising an optical pickup 11 for reading out information recorded in an optical disk 10 by using a light beam irradiated by an LED; a sled motor 12a for moving the optical pickup in the radial direction of the optical disk; a spindle motor 12b for rotating the optical disk; a driving unit 30 for driving the sled motor 12a and the spindle motor 12b; an radio-frequency (RF) demodulator 20 for demodulating and filtering the signal picked up by the optical pickup; a servo unit 40 for servo-controlling the driving unit on the basis of focus error signal, tracking error signal, and the rotational speed, and detecting synchronization signal from the RF demodulated signal; a digital signal processor 50 for processing the demodulated RF signal on the basis of the synchronization signals; a controlling unit 60 for performing operations needed to check if the optical disk loaded is a legitimate disk; a memory 61 for storing a TOC data; and a display unit 70 for displaying the authentication result.

Figure 5:
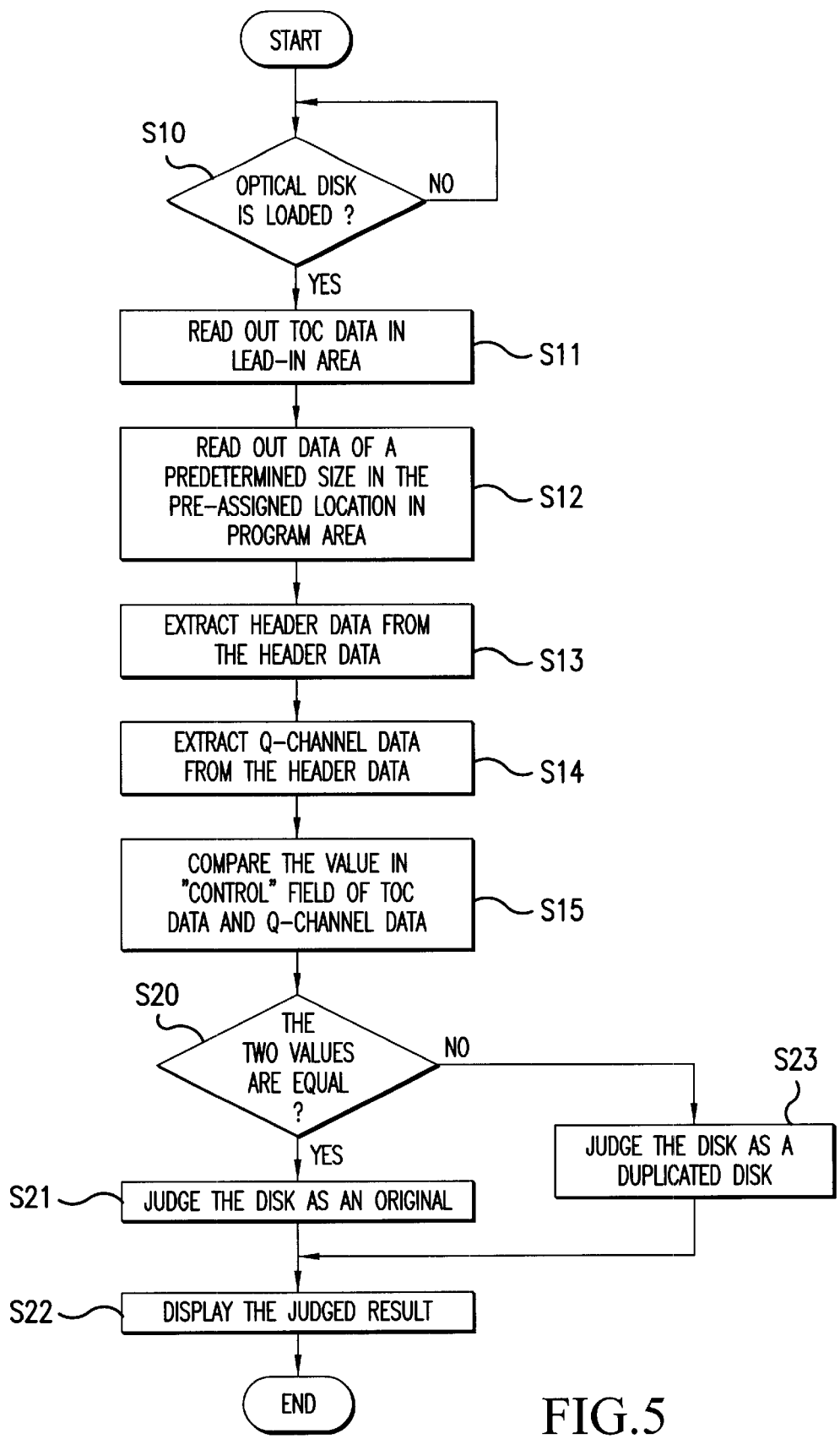
FIG. 5 is a flow chart of a method of authenticating an optical disk according to an embodiment of the present invention.

A method of authenticating an optical disk according the present invention is described below in detail with reference to FIG. 4 and a flowchart of FIG. 5.

Once an optical disk 10 is inserted and loaded (S10), before reproducing a specified song (in case of CD-DA) or an recorded item (in case of CD-ROM), the controlling unit 60 controls the optical pickup 11 through the driving unit 30 to read out a TOC data recorded in a lead-in area of the optical disk. The TOC data, that is, the Q-channel data recorded in the lead-in area represents the information such as the track number. The sub-Q data is made up each of 8 bits. As shown in FIG. 2A, the track number is recorded in the lead-in area. Next to the track number, the point (POINT) is recorded, followed by minutes (MIN), seconds (SEC) and the frame number (FRAME) specifying the elapsed time in the track. Then, PMIN, PSEC and PFRAME are recorded.

The RF signal containing the TOC data is filtered out by the R/F demodulator 20 and is then converted into digital data by the digital signal processor 50 based on synchronization signals detected by the servo unit 40.

The controlling unit 60 reads the TOC data into the memory 61 (S11), and then the optical pickup 11 is moved into a program area under control of the driving unit 30 and the servo unit 40. At this time, in case of the optical disk in which the 4-bit "control" field data in all of Q-channel data are different from that of the TOC data, the optical pickup 11 may be moved to an arbitrary position on the program area. On the other hand, in case where Q-channel data recorded on a predetermined region of the program area, the size of which is slightly larger than that of tracks for the optical pickup to swing while optical pickup is paused, e.g., about 4 minutes in terms of reproduction time, have different the 4-bit "control" field data, the optical pickup 11 is moved to the predetermined region with reference to information contained the TOC data. After the pickup is moved to the target location on the program area, a block of 98 frames is read out at that location (S12).

The controlling unit 60 extracts header information from 98 frames (S13) and then a Q-channel data is formed from the header information (S14). After that, a comparison is made as to whether or not the "control" field of the Q-channel data is coincident with that of the corresponding TOC data (S15). Whether the optical disk loaded is a legitimate disk or not is judged based on the comparison result (S20). If they are not the same, the optical disk is judged as a legitimate disk (S21). On the other hand, it is judged as an illegally-duplicated disk (S23). The judgement is displayed on the display unit 70 (S22).

Figure 6:
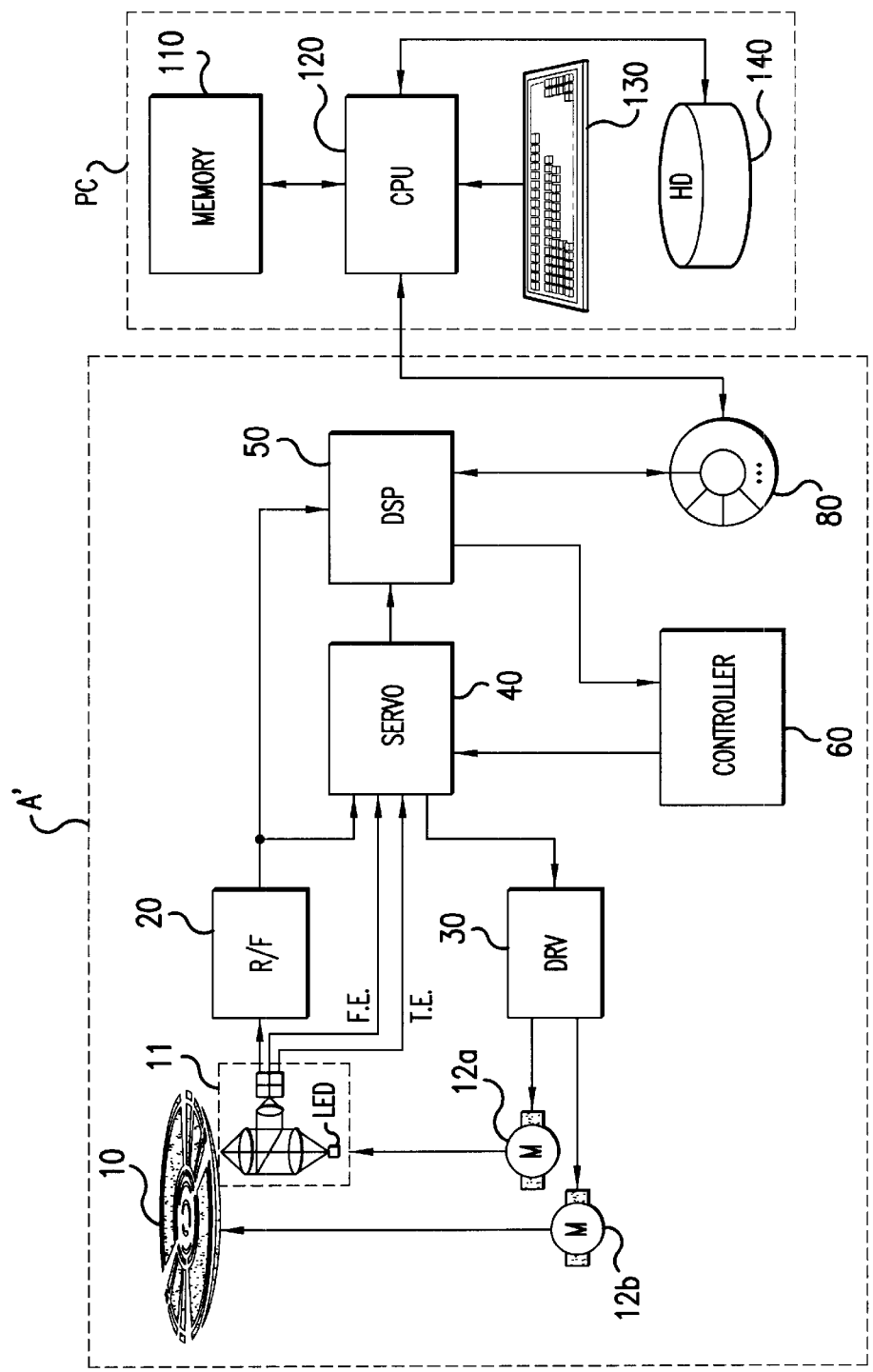
FIG. 6 is a schematic diagram showing a CD-ROM reproduction apparatus embodying the present invention.

FIG. 6 shows a functional block diagram of an optical disk reproduction apparatus to which a preferred embodiment of the present invention is applied, comprising an optical disk driver A' including a general CD-ROM driver and a ring buffer 80 for data transmission to a host computer system; and a personal computer system PC including a memory 110 for storing a program which is received from the ring buffer 80; a keyboard 130 for receiving a user command; a hard disk 140 for storing program; and a CPU 120 for executing a program.

Figure 7A:
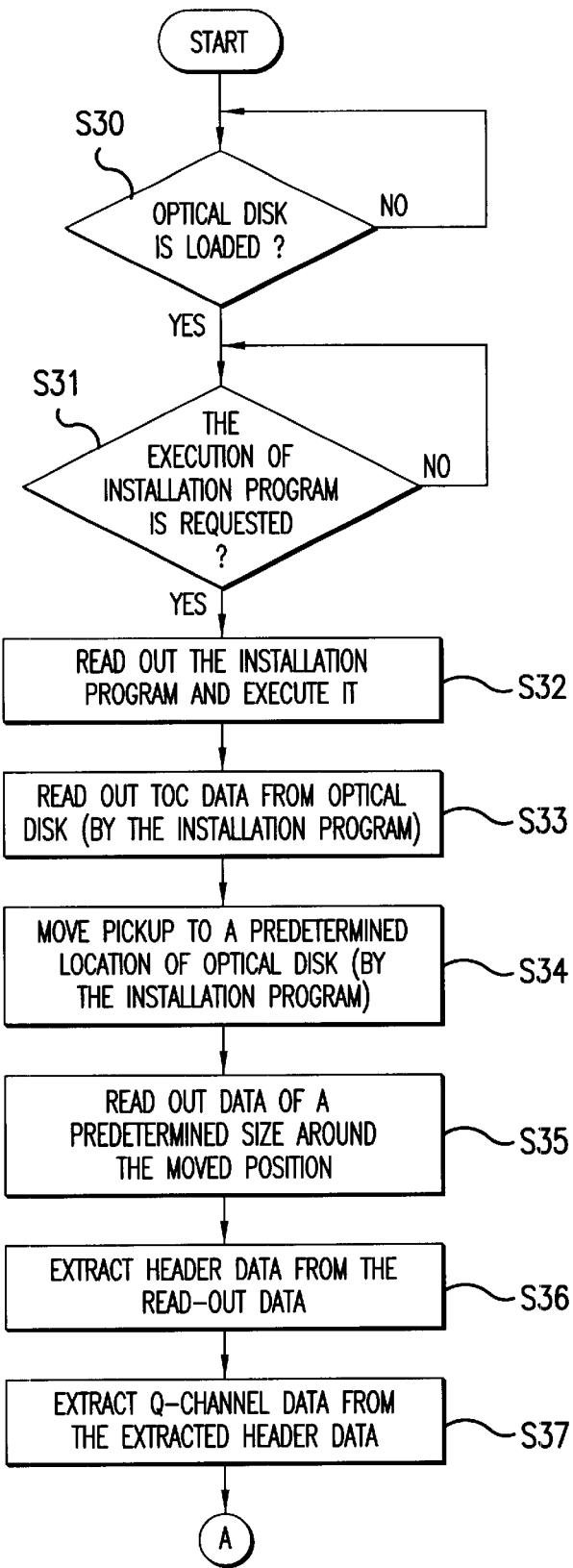
FIGS. 7A and 7B are flow charts showing a method of authenticating a CD-ROM in the reproduction apparatus of FIG. 6.
Figure 7B:
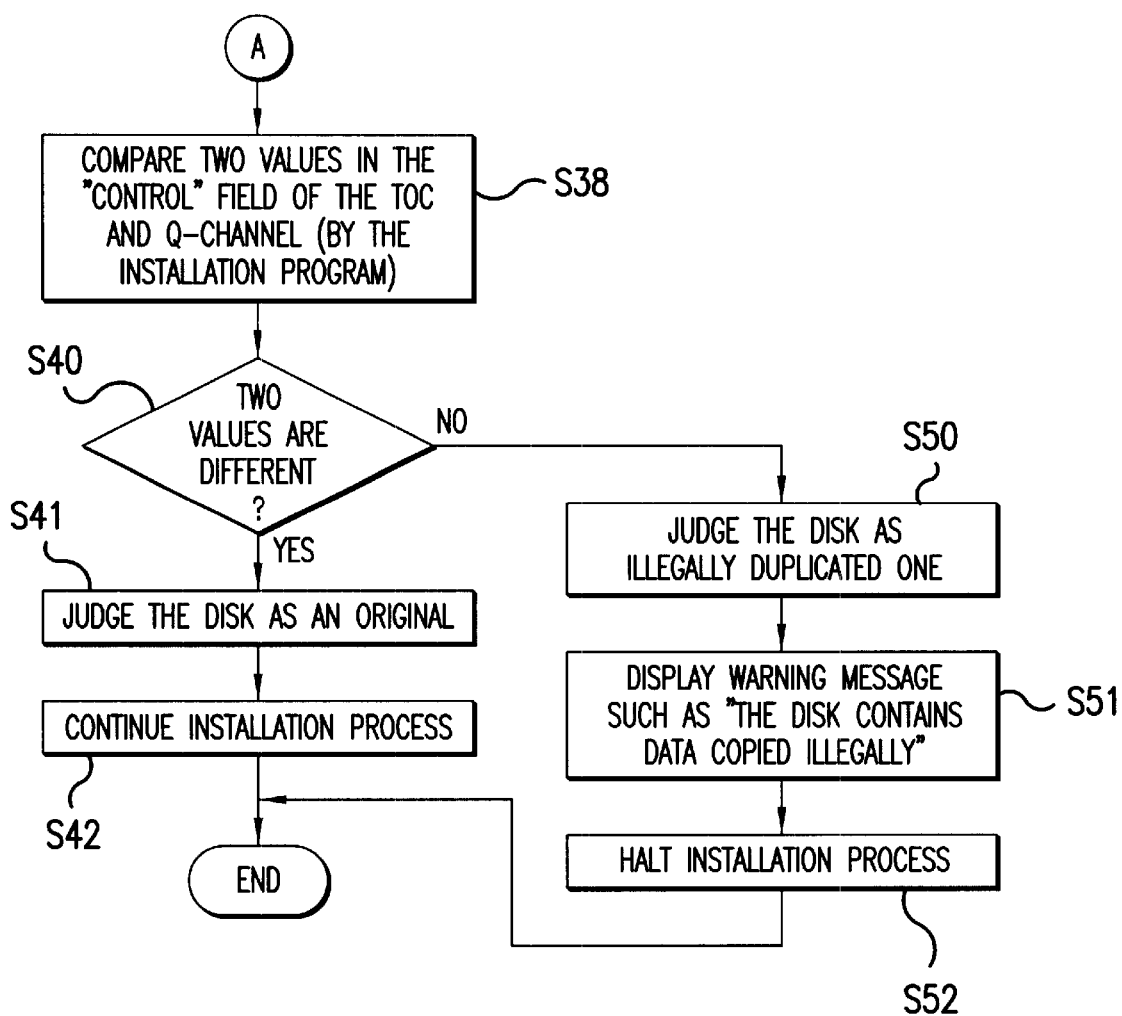

A method of authenticating an optical disk in the optical disk reproduction apparatus of FIG. 6 is described below in detail with reference to flowcharts of FIGS. 7A and 7B.

If a CD-ROM having a program required for the authentication operation is loaded in the optical disk driver A' (S30), a disk driving program is loaded from the hard disk 140 into the memory 110. A user requests the installation of application program on the CD-ROM through the keyboard 130 (S31). Specifically, the driving program running on CPU 120 requests the transmission of an installation program to install the application program on the CD-ROM to the controlling unit 60 of the CD-ROM driver through the ring buffer 80.

On receiving the request, the optical pickup 11 is, under control of the controlling unit 60, moved to a prescribed area where the installation program is recorded. The data stored in the prescribed area is read out through the R/F demodulator 20, the servo unit 40, and the digital signal processor 50. The installation program is stored temporarily in the ring buffer 80 and is then sequentially transmitted to the memory 110 of the host computer system. Note that none of subcodes is sent to the host computer system in this transmission time.

Once the transmission is completed, the installation program is executed on the CPU 120 (S32). A TOC read-out command signal is first sent to the controlling unit 60 through the ring buffer 80. On receiving the command signal, the controlling unit 60 controls the optical pickup 11 to read in a TOC data in the lead-in area (track # 0 to track #1) (S33). The TOC data is then sent to the host computer system through the ring buffer 80. Receiving the TOC data, the installation program requests the controlling unit 60 to read out and send Q-channel data recorded in a predetermined area where the "control" field data of Q-channel data is different from that of the TOC data. The size of the predetermined area is slightly larger than average of the track width for the optical pickup to swing while movement of the optical pickup is paused, e.g., about 4 minutes in terms of reproduction time. In response to the request, the controlling unit 60 moves the optical pickup 11 to the beginning of the predetermined area on the CD-ROM and pause the pickup around that location (S34).

Once the movement is completed, the optical pickup 11 starts to read out data while repeatedly tracking the predetermined area and, at the same time, the installation program requests the controlling unit 60 to send Q-channel data in the data read out through the ring buffer 80. In response to the request, the controlling unit 60 gathers header information from the data read out in the predetermined area to form a Q-channel data (S35,S36,S37).

The Q-channel data is transmitted to the host computer system through the ring buffer 80 and is then inputted for the installation program running therein. A comparison is made as to whether or not data in the "control" field of the Q-channel data is coincident with that of the TOC data stored already in the memory (S38, S40). If it is determined that they are equal to each other (S50), the CD-ROM is judged as a duplicated disk. "Duplicated disk" and warning messages on the display unit is displayed (S51), followed by stop and termination of the operation of the program (S52). If the CD-ROM is judged as a legitimate disk, the installation program continues to be executed (S42).

Another preferred embodiment of the present invention, different from the foregoing embodiment, is described below in detail referring to FIGS. 8 to 12.

Figure 8:
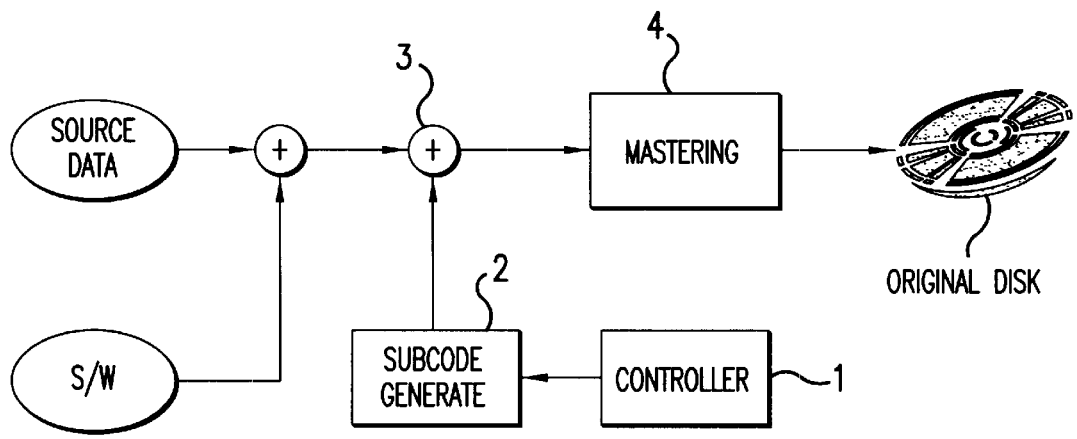
FIG. 8 is a schematic diagram showing an optical disk fabrication apparatus for producing an optical disk with duplication prevention function according to the present invention.

The functional block diagram of an optical disk production apparatus according to this embodiment is shown in FIG. 8. The disk production apparatus comprises a subcode generator 2 for generating sub-P channel data and sub-Q channel data with reproduction time information for every predetermined size of data from a digital master tape; a data mixer 3 for composing the channel data and the data to be recorded in accordance with the frame format in an optical disk; a mastering unit 4 for producing an optical disk; and a controller 1 for controlling the subcode generator so that reproduction time information included in the sub-Q channel data is generated in the reverse order.

The detailed disk production process in the apparatus of FIG. 8 is as follows. The subcode generator 2 generates P/Q channel data for source data from a digital master tape (e.g., music, moving pictures, or program) in accordance with the standard specification. For example, for the beginning part of each data having a predetermined size, e.g., the data amounting to a song, sub-P channel data have "1" for at least two seconds, but "0" thereafter. In addition, sub-Q channel data, shown in FIG. 2B, is generated by the subcode generator 2 and is then inputted to the data mixer 3, together with the sub-P channel data. Then, the data mixer 3 composes the channel data and the data to be recorded in accordance with the frame format of FIG. 1.

Figure 9:
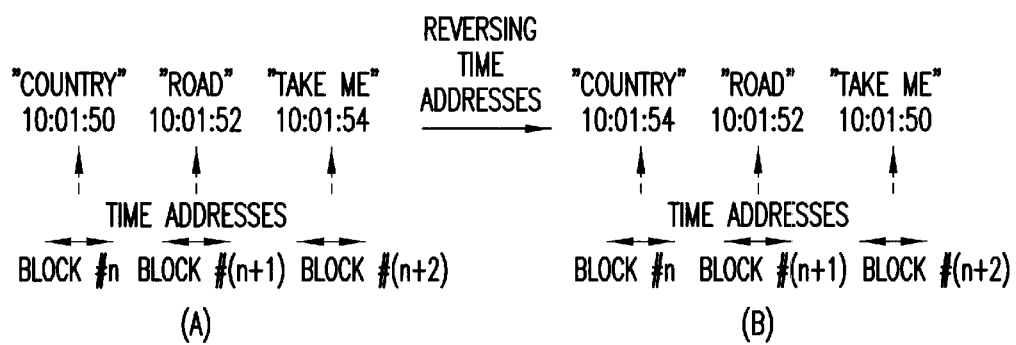
FIG. 9 illustrates an operation of reversing reproduction time information belonging to a data unit of recording.

Meanwhile, during the generation of the channel data, the controller 1 makes the subcode generator 2 output reproduction time information in the reverse order for a chosen data. Specifically, the absolute time address or absolute frame number is generated sequentially for every one block of data (98 frames). For a predetermined number of blocks, the subcode generator 2 generates the absolute time address or absolute frame number in the reverse order. FIG. 9 illustrates that absolute time addresses (MIN, SEC) for three blocks of 98 frames #98×n, #98×(n+1) and #98×(n+2) is reversed. The frame data and their associated reversed absolute time addresses are combined by the data mixer 3 in accordance with the data format of FIG. 1.

Figure 3:
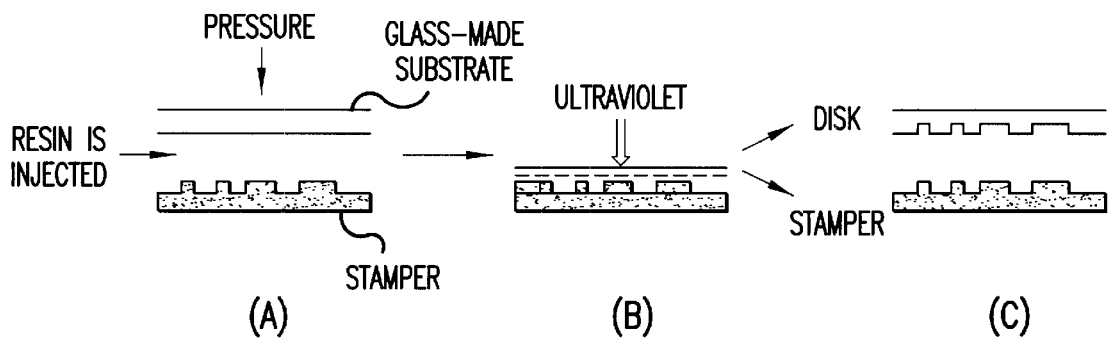
FIG. 3 is a schematic diagram showing part of a fabrication process of an optical disk.

The mastering unit 4 produces a stamper in accordance with the data outputted from the data mixer 3. An optical disk where reproduction time information associated with a predetermined interval of data is revered is manufactured by using the stamper, as shown in FIG. 3. After that, a reflective thin layer is formed on the optical disk and then a protective thin layer is deposited on the reflective thin-layer to prevent oxidization thereof.

Like CD-DA, CD-ROM titles can be manufactured according the above-mentioned fabrication process, but it is preferred that the reversed reproduction time information is recorded in a prescribed area and that a program, which is needed to check whether or not the CD-ROM title is a legitimate production, is further provided in part of the program area other than the prescribed area.

An optical disk having some of reversed reproduction time information is not prevented from being reproduced in general optical disk drivers. This is because general optical disk drivers reproduce and output the data recorded on an optical disk in the recording order without respect to reproduction time information thereon. Furthermore, if data which are associated with reproduction time information to be reversed is confined in a physical track, track jump operation which is performed based on sub-Q channel data is not affected by the reversed reproduction time information in the sub-Q channel data.

In case where an optical disk is duplicated in general optical disk duplication apparatuses like CD-RW driver, reproduction time information on the source disk is not copied into the target disk. That is, even though absolute time addresses corresponding to the data being used for authentication such as "country road take me . . . " of FIG. 9 are reversed in the source disk like [10:01:54, 10:01:52, 10:01:50], the data is just read out from the source disk without referring to the absolute time addresses and only the data is copied to the target disk along with arbitrary absolute time addresses which are internally generated, e.g., [21:05:41, 21:05:43, 21:05:45]. As a result, the duplicated disk does not have any reversed absolute time addresses.

Figure 11:
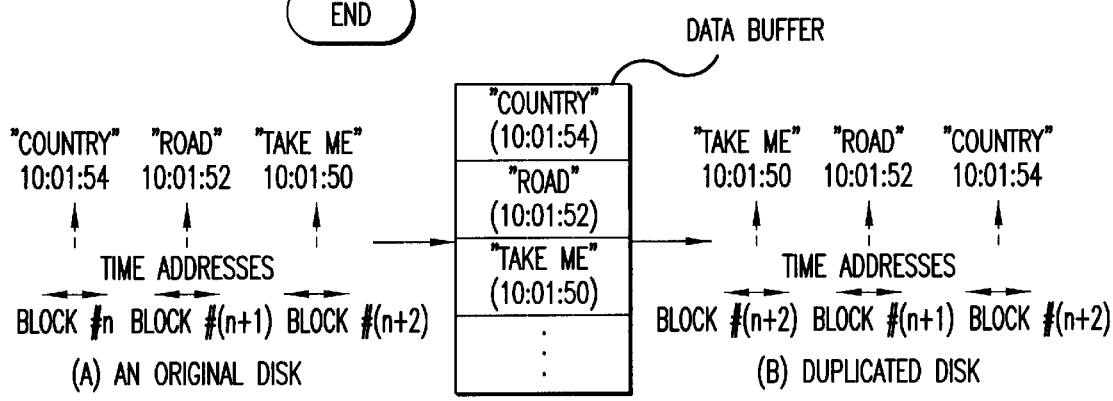
FIG. 11 illustrates a duplication process performed by a specialized optical disk duplication apparatus.

In case of specialized optical disk duplication apparatuses like CD-DA duplication apparatus, the data on the original source disk, as shown in (a) of FIG. 11 are stored temporarily in its internal buffer of a large capacity. Once the buffering is completed, the data in the buffer are retrieved on the basis of their own reproduction time information, not in the order in which they were stored in the buffer. Accordingly, the data on the source disk shown in (a) of FIG. 11 are recorded on the duplicated disk in the form of (b) of FIG. 11. The recorded data associated with the reversed reproduction time information are recorded in a duplicated disk in an arbitrary order in accordance with the reversed reproduction time information. Hence, music or the like on the duplicated disk sounds scrambled and programs on the duplicated disk does not work.

When reproduction time information is reversed, frame number (FRAME of FIG. 2B) can be used in this embodiment in place of the absolute time addresses.

Figure 10:
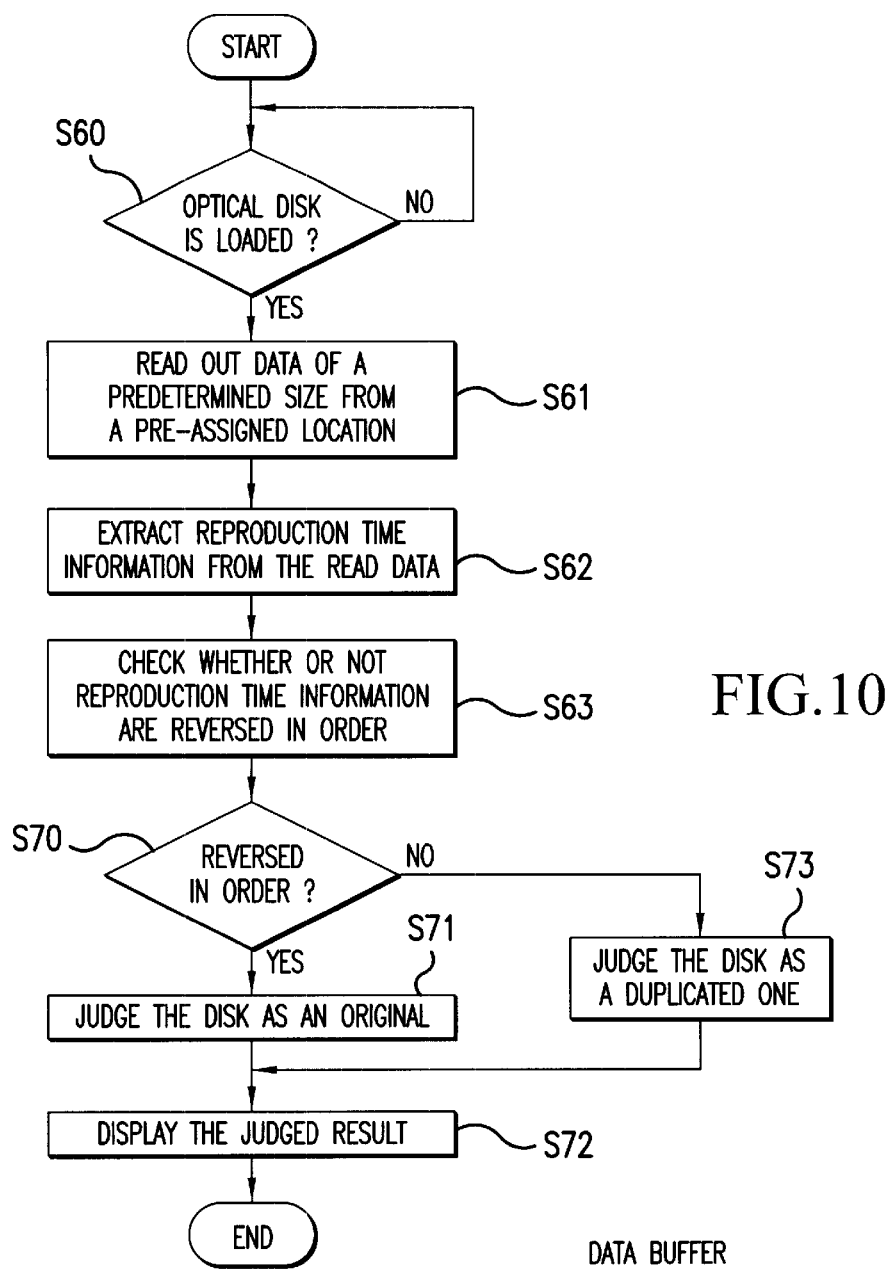
FIG. 10 is a flow chart of a method of authenticating an optical disk according to another embodiment of the present invention.

A method of authenticating an optical disk according to this embodiment of the present invention is described below in detail with reference to a flowchart of FIG. 10 and a reproduction apparatus of FIG. 4.

If an optical disk is loaded (S60), the controlling unit 60 controls the optical pickup 11 through the driving unit 30 and the servo unit 40 so that the optical pickup 11 is moved to the prescribed area on the optical disk in which reversed reproduction time information is recorded and blocks of 98 frames at that location are read out (S61).

The RF signal read out by the pickup 11 is shaped into binary pulses by the R/F demodulator 20 and is then converted into digital data by the digital signal processor 50 based on phase synchronization clock.

Sub-Q channel data including the reproduction time information are extracted from blocks, each consisting of 98 frames, by the controlling unit 40 (S62). The sub-Q channel data are then checked whether the reproduction time information therein is in the reverse order (S63). If it is determined that they are in the reversed order (S70), the optical disk is judged as a legitimate disk (S71). Otherwise, the optical disk is judged as a duplicated disk (S73). "Duplicated disk" and warning messages on the displaying unit 70 is then displayed (S72).

Instead of reversing reproduction time information of contiguously located blocks, each consisting of 98 frames, as described above, reproduction time information of about 70 bocks, which amounts to 1 second in terms of reproduction time, can be reordered arbitrarily without concern of display of the reordered time information. This is because most optical disk reproduction apparatus displays reproduction time in units of second.

Figure 12:
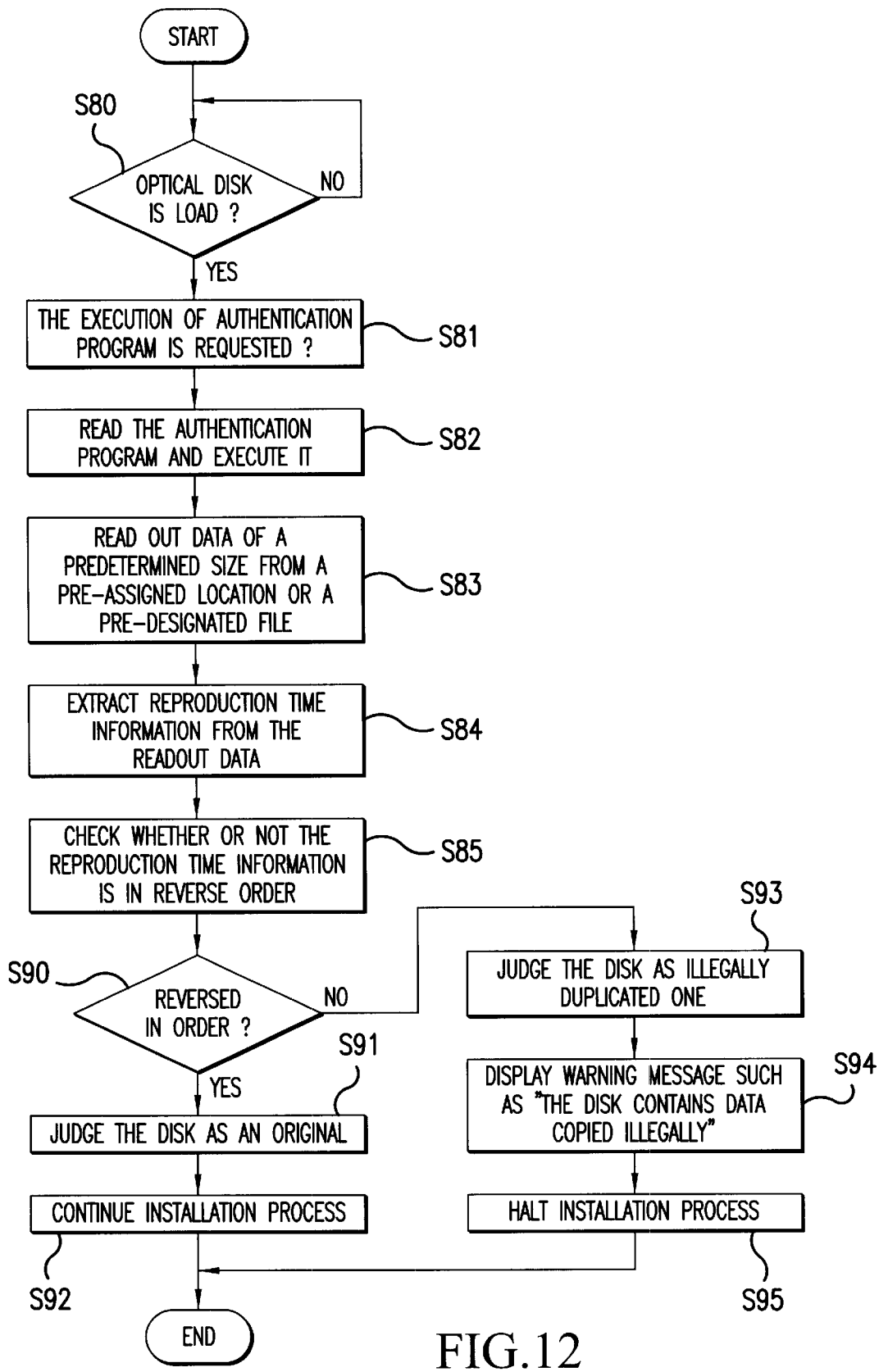
FIG. 12 is a flow chart showing another method of authenticating a CD-ROM in the reproduction apparatus of FIG. 6.

A method of authenticating an optical disk according to this embodiment of the present invention in the optical disk reproduction apparatus of FIG. 6 is described below in detail with reference to a flowchart of FIG. 12.

If a CD-ROM where a program required for the authentication operation is recorded in a specified area as a file is loaded into the optical disk driver A' (S80), the authentication program is transmitted to the host computer system and is loaded in the memory 110 through the procedures previously described in the foregoing embodiment (S81). Once the transmission is completed, the authentication program is executed on the CPU 120 (S82). A control command signifying that reproduction and sending of data in a prescribed area or a specified file together with their associated reproduction time information is sent to the controlling unit 60 of the disk driver through the ring buffer 80.

On receiving the command, the controlling unit 60 controls the optical pickup 11 to read out blocks in the prescribed area or the specified file (S83) and to send the data to the host computer system through the ring buffer 80. The authentication program running on the CPU checks whether or not the reproduction time information included in the sub-Q channel data is in the reverse order (S84,S85,S90). Depending on the check result, the CD-ROM is judged as either legitimate disk or duplicated disk (S91,S93), followed by the same subsequent operations as those of the foregoing embodiment (S92,S94,S95).

Moreover, a subprogram may be further recorded on the optical disk where reproduction time information in a prescribed area is recorded in the reverse order so as to automatically detect the prescribed area having the reversed reproduction time information. Some errors in the authentication process due to errors in sub-Q channel data may be prevented.

Although foregoing embodiments have been described with P- and Q-channel data, the present invention can be embodied with other subcodes such as R-, S-, T-, U-, V-, and W-channel data.

The foregoing is provided only for the purpose of illustration and explanation of the preferred embodiments of the present invention, so changes, variations and modifications may be made without departing from the spirit and scope of the invention.

What is claimed is:

1. An optical storage medium having values in a predetermined field of reproduction control data in a program area that are written in the inverse order that values in the corresponding field of a table-of-content data in a lead-in area are written in.

2. An optical storage medium according to claim 1, wherein the reproduction control data with the values in the predetermined field is recorded in a larger area whose size is larger than that of tracks for an optical pickup to swing on pause mode.

3. An optical storage medium according to claim 1, comprising a recorded program, the function of the program being to check whether an optical storage medium is an original or not based on the order difference between values respectively written in the predetermined fields of the reproduction control data and the table-of-content data.

4. An optical storage medium according to claim 1, wherein the predetermined field is "CONTROL" field within Q channel data composed from headers of data frames.

5. A method of authenticating an optical storage medium loaded, comprising the steps of:

reading out a table-of-content data from a lead-in area of the optical storage medium;

extracting reproduction control data from data recorded in a program area of the optical storage medium;

checking whether or not a value in a predetermined field of the reproduction control data is identical to that in the corresponding field of the table-of-content data; and determining whether the optical storage medium is an original or not based upon the checking result.

6. A method of authenticating an optical storage medium loaded, comprising the steps of:

reading and executing a program recorded in the optical storage medium;

reading and executing an installation program which is recorded in a predetermined area in the optical storage medium under control of the executed program;

checking whether or not a value in a predetermined field of a reproduction control data, which is extracted from data in a program area, is coincident with that in the corresponding field of the table-of-content data recorded in a lead-in area, the checking operation being executed by the installation program; and installing an application program recorded in the optical storage medium based upon the checking result.

* * * * *